US006706299B2

(12) United States Patent
Thengumpillil et al.

(10) Patent No.: US 6,706,299 B2
(45) Date of Patent: Mar. 16, 2004

(54) PROCESS FOR THE PREPARATION OF RICE BRAN OIL LOW IN PHOSPHOROUS CONTENT

(75) Inventors: Narayana Balagopala Kaimal Thengumpillil, Hyderabad (IN); Rajamma Ongole, Hyderabad (IN); Satya Bhaskar Potula, Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 23 days.

(21) Appl. No.: 09/820,201

(22) Filed: Mar. 28, 2001

(65) Prior Publication Data

US 2002/0172741 A1 Nov. 21, 2002

(51) Int. Cl.$^{7}$ .................................................. A23D 9/02

(52) U.S. Cl. .................... 426/417; 426/478; 426/330.6; 554/17; 554/23

(58) Field of Search ................................. 426/417, 489, 426/490, 492, 494, 493, 478, 330.06; 554/8–13, 15, 17, 20, 23

(56) References Cited

U.S. PATENT DOCUMENTS 4,496,489 A * 1/1985 SenGupta .................... 554/83
5,166,376 A * 11/1992 Suzuki et al. ................. 554/10
5,290,579 A * 3/1994 Hitotsumatsu
5,552,167 A * 9/1996 Taylor
5,880,300 A * 3/1999 Kodali ....................... 426/417
5,985,344 A * 11/1999 Cherukrui
6,303,803 B1 * 10/2001 Kodali ....................... 426/417

* cited by examiner

*Primary Examiner*—Carolyn Paden
(74) *Attorney, Agent, or Firm*—Ladas & Parry

(57) ABSTRACT

The present invention relates to a simple, and economical process for the preparation of rice bran oil low in phosphorous content (<10 ppm) by treatment of crude rice bran oil to substantially remove the phosphoglycolipids responsible for the residual phosphorus in degummed rice bran oil, said process comprising:

a) treating the crude rice bran oil at ambient temperature with 5% of boiling water and separating the sludge formed to obtain a clarified oil, b) treating the clarified oil thus obtained with 0.5% to 10% of a reagent selected from the group consisting of mono-, di- or triethanolamine to obtain said low phosphorous content oil.

4 Claims, No Drawings

PROCESS FOR THE PREPARATION OF RICE BRAN OIL LOW IN PHOSPHOROUS CONTENT

FIELD OF INVENTION

The present invention relates to a process for the preparation of rice bran oil low in phosphorous content. More specifically, the present invention relates to a process for the pretreatment of rice bran oil for its further processing by physical or chemical refining. The pretreatment aims at the removal of all phosphorus-containing compounds including the phosphorus-containing glycolipids.

BACKGROUND OF THE INVENTION

Owing to the presence of the phosphoglycolipids, crude rice bran oil cannot be degummed by known chemical methods to the levels required for physical refining.

Rice bran oil is an important vegetable oil. India produces about 5,00,000 tons of rice bran oil annually. Rice bran oil is considered to be a superior edible oil owing to its balanced fatty acid composition and the presence of nutritionally beneficial constituents such as γ-oryzanol, squalene, tocopherols, tocotrienols etc. (deDecker, E. A. M. and Korver, O., *Nutr. Rev.,* 1996, 54 (11), S120). In China and Japan rice bran oil is one of the most favoured edible oils, popularly known as "heart oil". Unfortunately, though India is the largest producer of this commodity, only about 10% of the rice bran oil produced go for direct human consumption. High free fatty acid content, high wax content, high non-saponifiable matter content and dark colour all add to the problems associated with rice bran oil refining.

For production of edible oils of highest quality, the refining process generally comprises the steps of degumming, deacidification, bleaching and deodorization. In recent times considerable efforts have been made to make the degumming process in particular, more efficient and cost effective. The desired goal in this connection is to degum the oil to such an extent that it can subsequently be deacidified by means of vacuum distillation (physical refining). This distillative deacidification has great advantages compared to the conventional process of alkali neutralization in that no waste is produced and that the refining loss is considerably reduced. However, a prerequisite for this process of physical refining is a very low content of phosphatides, i.e., a phosphorus content of less than 15 ppm in the oil, preferably less than 10 ppm. Phosphorus content of less than 5 ppm is ideal. For oils containing high FFA (such as rice bran oil), physical refining is the preferred mode of processing. Practical experience with physical refining shows that it leads to desirable results only when a very good quality of starting material is used. For successful operation of physical refining, efficient pretreatment steps are, therefore, of utmost importance. There are no efficient pretreatment processes which would make all fats and oils amenable to physical refining irrespective of their initial quality (Forster, A. and Harper, A. J., *J. Am. Oil Chem. Soc.,* 69, 1983, 265). Incomplete removal of undesirable components from the oil in the pretreatment steps can be compensated in some cases by increased bleaching earth usage in the bleaching step (Ohlson, K, *J. Am. Oil Chem. Soc.,* 69, 1992, 195).

The major emphasis, thus, has to be placed on preliminary processing of crude oil prior to steam refining. This should be aimed at removal of any component of the oil that may darken the color or undergo other adverse alterations during the high temperature operation and thus, deteriorate the quality of the oil. It is truly said that technology of physical refining is more about how to remove gums and other impurities in upstream processing, i.e, in degumming and bleaching (Norris, F. A., in *Bailey's Industrial Oil and Fat Products,* Vol. 3, T. H. Applewhite (ed.), John Wiley & Sons, NY, 1985). The development of physical refining technique, therefore, is more dependent on the development of the pretreatment methods.

Degumming is the first step whereby the crude oil is subjected to treatment before the operation of removal of free fatty acid is undertaken. Degumming primarily removes phospholipids and other mucilages from oil and quality of the degummed oil is generally judged by its phosphorus and trace metal contents. If not removed effectively in the initial stage, these impurities may eventually interfere with the subsequent refining steps. Phospholipids present in oils are broadly classified as hydratable and non-hydratable types While hydratables are removed from oil by a simple water degumming step, non-hydratables need some special treatment. Phosphoric acid and citric acid are commonly used in practice to remove non-hydratable phosphatides. However, as they are not soluble in oil, these acids must be thoroughly mixed to achieve the desired results.

Stringent requirements of raw material quality for oils meant for physical refining saw the development of number new degumming processes and newer adsorbents in the pretreatment steps. References may be made to the development of various types of degumming processes. Alcon process was developed to attain the trading specifications of soybean oil by water degumming (Kock, M., in: *Proceedings of Second ASA Symposium on Soybean Processing,* American Soybean Association, 1981). Later it was extended to steam refining of oils (Penk, G., Paper presented at the ISF-AOCS World Congress, Tokyo, 1988). Dry degumming method was slightly modified by replacing a part of the bleaching earth by a synthetic silica hydrogel, Trisyl (Welsh, W. A. and Parent, Y. O., Eur. Pat. EP 0185 182, 1986) to get an oil fit for physical refining. A variety of modifications of the acid degumming was also suggested (Mag, T. K. and Reid, M. P., U.S. Pat. No. 4,240,972, 1980; Carlson, K. F., in: *Bailey's Industrial Oil and Fat products,* Vol. 4., fifth edition, Y. H. Hui (ed.), John Wiley & Sons Inc., New York, 1996). Superdegumming was developed by Unilever (Segers, J. C., *Fette Seifen Anstrichm.,* 84, 1982, 543) and later modified by others (Kaji, T., Eur. Pat. EP 0269, 277, 1988; Van de Sande, R. I. K M and Segers, J. C., Eur. Pat. EP 0348004, 1989). Another group of scientists had developed total degumming process, popularly known as TOP degumming (Dijkstra, A. J. and Van Opstal, U.S. Pat. No. 4,698,185, 1987). It was claimed that this process was useful to reduce phosphorus and iron level to attain the quality of the oil which might go for physical refining (Dijkstra, A. J., in: *Proceedings of World Conference on Oilseed Technology and Utilization,* Budapest, Hungary, T. H. Applewhite (ed.), AOCS, Champaign, Ill., 1993, 138).

Unfortunately, as applied to crude rice bran oil, none of these methods produce oil of low phosphorus content. Even enzymatic methods using phospholipase $A_2$ were not satisfactory. However, a process making use of lipase G (an enzyme not normally used for degumming) was found to give satisfactory results (T. N. B. Kaimal et. al, Indian Pat. 184,701 (2000). Our continued research traced the difficulties in degumming of rice bran oil to the presence of phosphorus-containing glycolipids in the oil (unpublished results). These phosphoglycolipids are not removed by the known degumming methods and we have been successful in removing these compounds from the oil by extraction of the crude oil with alcoholic solvents such as isopropanol or ethanol (Indian patent applied for). While the method has given satisfactory results, the use of organic solvents and the resultant loss of oil in the organic phase during the process could be considered drawbacks. This led us further to search for non-solvent methods to achieve the results.

OBJECTS OF THE INVENTION

The main object of the invention is to provide a process for the removal of phosphoglycolipids by reaction of the acidic phosphate groups of those lipids with a mild organic base such as ethanolamines.

Another object of the invention is to provide an simple, economical and fast process for obtaining phosphorus free rice bran oil.

SUMMARY OF THE INVENTION

Accordingly, the present invention provides a process for the preparation of rice bran oil low in phosphorous content (<10 ppm) said by treatment of crude rice bran oil to substantially remove the phosphoglycolipids responsible for the residual phosphorus in degummed rice bran oil, said process comprising.

a) treating the crude rice bran oil at ambient temperature with 5% of boiling water and separating the sludge formed to obtain a clarified oil, b) treating the clarified oil thus obtained with 0.5% to 10% of a reagent selected from the group consisting of mono-, di- or triethanolamine to obtain said low phosphorous content oil.

In one embodiment of the invention, in step (b) after sufficient contact period a further quantity of boiling water (5%) is added and the sludge so formed removed to obtain oil with less than 10 ppm of phosphorus.

In a further embodiment of the invention, the clarified oil obtained in step (a) is treated in step (b) with a 10% excess of the said reagent over the stoichiometric requirement to neutralize the free fatty acids present and then treated with a further quantity of boiling water in an amount of 5% of the mixture to obtain an oil with less than 0.5% free fatty acids, subjecting said oil to bleaching and deodorization to obtain oil with less than 10 ppm of phosphorus with the micronutrients present in the oil substantially intact.

In a further embodiment of the invention, in step (a) the separation of the sludge formed is done by centrifugation, filtration or any other suitable method.

The process of the invention in conjunction with the simultaneous dewaxing degumming process yields oil low in phosphorus content suitable for physical refining or even can achieve deacidification as well, if sufficient reagent was present to combine with the free fatty acids present in the oil. In addition to reducing the number of processing steps, the present invention has other economic advantages.

The present invention provides for a method of substantially removing the phosphoglycolipids, responsible for the residual phosphorus in degummed rice bran oil, to yield an oil low in phosphorus content (<10 ppm) and suitable for physical refining, or optionally achieve deacidification as well in a single step and consists of a) treating the crude oil at ambient temperature with 5% of boiling water and separating the sludge formed by centrifugation, filtration or any other suitable method; b) treating the clarified oil thus obtained with 0.5% of mono-, di- or triethanolamine (if the oil is to be subsequently subjected to physical refining) and after sufficient contact period adding a further quantity of boiling water (5%) and removing the sludge formed as before to obtain an oil with less than 10 ppm of phosphorus, or c) treating the oil with a 10% excess of the reagent over the stoichiometric requirement to neutralize the free fatty acids present and repeating the process as in (b) to obtain an oil with less than 0.5% FFA and which may be subjected to conventional bleaching and deodorization to obtain a fully refined oil with the micronutrients present in the oil substantially intact and hence nutritionally superior oil than would have been possible by conventional alkali refining.

DETAILED DESCRIPTION OF THE INVENTION

Crude rice bran oil poses many problems in refining. This is brought about by its high content of free fatty acids, high contents of waxes, high contents of non saponifiable matter, high contents of polar lipids, especially glycolipids, and dark colour. Crude rice bran oil is almost twice as viscous as other common vegetable oils (Goplakrishna, A. G., *J. Am. Oil Chem. Soc.,* 1993, 70, 895). All these factors contribute to high refining losses when subjected to conventional alkali refining. Removal of these undesirable constituents is a must if the oil is to be subjected to physical refining and hence the need for efficient pretreatment methods.

It was observed that, unlike other vegetable oils, rice bran oil can hold its own or more volume of water without the water separating out from the oil. This is a unique feature of the oil and a very strong emulsion can be formed easily by mixing hot water with crude rice bran oil. This property was utilized to evolve a process where simultaneous degumming and dewaxing could be achieved (Kaimal, T. N. B., et. al, Indian Patent No. 183,639, 2000). This property also indicated the possible presence of highly surface active components in the oil and was traced to the presence of phosphorus containing glycolipids in the oil (work to be published). Owing to the presence of such compounds, the phosphorus content oil is not reduced to the desired levels by any of the known chemical methods of degumming. Similarly, complexing agents such as phosphoric or citric acids were also not helpful in reducing the phosphorus content.

Ethanolamines have not been used earlier for the purpose indicated in the present invention. However, a 1955 publication (Cousins, E. R., et al, *J. Am. Oil Chem. Soc.,* 1955, 32, 561) details the use of these compounds, among others, as additives in alkali refining of rice bran oil in an attempt to reduce refining losses. The nature of components responsible for the high refining losses was not apparent to these authors although they did make a statement about the possible presence of highly surface active components in the oil. In the present invention, these compounds are used to remove the phosphoglycolipids, presumably by combining with the phosphate group present in these molecules. While mono-, di- and triethanolamines were effective, the diethanolamine treated oils were lighter in colour and hence is preferred.

In addition to removing the phosphoglycolipids, these reagents were also found effective in deacidification of the oil and the advantages of such treatment will be apparent to those skilled in the art. Thus removal of the residual phosphorus and deacidification can be achieved in a single step thus reducing the number of process steps. A further advantage is that this achieved at ambient temperature effecting savings in energy. A still further advantage compared to alkali refining arises from the fact that the nutritionally beneficial oryzanol and tocotrienols are not lost by this treatment. A still further advantage is that the fatty acids are removed as ethanolamine salts which may be converted to ethanolamides. Fatty acid ethanolamides are commercially proven surfactants and are of higher value than the soap stock generated during alkali neutralization.

The present invention can be carried out in a simple manner, much simpler than any known processes in prior art. Crude rice bran oil at ambient temperature is treated under stirring with 5% its volume of boiling water for 30–120 minutes and the mixture is allowed to settle 60–120 min. The sludge formed is separated by centrifugation or filtration. The waxes and most of the gums are separated at this stage. The supernatant is then treated with 2.0% of diethanolamine (If the oil is intended for physical refining, the ethanolamine concentration is reduced to 0.5%) under stirring conditions for 30–120 min. This was followed by addition of further quantity (5 vol %) of boiling water and stirring for 30–60 min. After settling the mixture for 30–60 min the mixture was centrifuged to obtain an oil free of waxes, gums and free fatty acids. The phosphorus content of the oil thus obtained was in the range of 7–9 ppm. This oil may be subjected to conventional bleaching and deodorization steps to complete the refining process.

Further, the process can be modified to achieve deacidification of the oil as well, thus providing an alternative to the conventional alkali refining which entails extraordinarily high losses in the case of rice bran oil. The process involves treatment of the crude oil with ethanolamines in conjunction with the simultaneous dewaxing and degumming process developed earlier (Indian Pat., 183,639 (2000)). At low levels (~0.5%), the ethanolamines, especially diethanolamine, act as an efficient degumming agent producing an oil with less than 10 ppm of phosphorus, presumably by reaction with the phosphate group of the phosphoglycolipid. At higher concentrations (stoichiometric equivalent to the free fatty acids (FFA) content of the oil), the ethanolamine acts also as a deacidification agent producing an oil with less than 0.5% of free fatty acids. Under these conditions, the degumming and deacidification can be combined in a single step thus greatly simplifying the refining of crude rice bran oil. Further, the deacidification can be achieved at ambient temperatures thus effecting savings in energy. Unlike alkali refining, ethanolamine deacidification does not remove the nutritionally important gamma oryzanol present in the oil. Being weak organic bases, they also do not saponify the oil thus reducing neutralization losses during refining. A further advantage is that the fatty acids are removed as fatty acid-ethanolamine salts which can potentially be converted to their ethanolamides that are of higher value than the soap stock produced in alkali neutralization and thus do not produce effluents. These advantages should offset the higher cost of the reagent compared to caustic soda. Rice bran oil is difficult to refine by conventional refining methods.

The following examples are given by way of illustrations and therefore, should not be construed to limit the scope of the present invention.

EXAMPLE 1

100 grams of crude rice bran oil having initial phosphorus content of 358 ppm, free fatty acid content of 7.98%, oryzanol content of 1.35% and having a color value of 32.6 Y+5.2 R+0.2 B (in 1 cm. Cell, Lovibond) was treated under stirring with 5 vol % of boiling water (or water ≧95° C.) for 30 min and allowed to settle for 60 min. The mixture was centrifuged to obtain the clear nit phase. This treatment produced oil substantially free of waxes and of 90% of the gums. The oil was then treated with 3% of monoethanolamine under stirring for 30 min followed by 5 vol % of boiling water as before, allowed to settle for 60 min and centrifuged to yield an oil with a phosphorus content of 10.9 ppm and acid value (mg KOH/g) of 0.9.

EXAMPLE 2

The oil was treated as in Example 1, but with 3% diethanolamine in place of monoethanolamine to yield oil with a phosphorus content of 7.5 ppm and acid value of 0.8.

EXAMPLE 3

The oil was treated as in Example 1, but with 3% triethanolamine in place of monoethanolamine to yield oil with a phosphorus content of 10.7 ppm and acid value of 2.9.

EXAMPLES 4–6

The experiments were carried out as in Example 2, but with varying concentrations of diethanolamine. Results are given in Table 1.

| | Characicristics | | |
|---|---|---|---|
| Sample | Aoid value (mg KOH/g) | Phosphorus ppm | γ-Oryzanol (%) |
| Crude RBO | 16.0 | 365 | 1.30 |
| RBO + 0.5% DEA | 4.1 | 9.7 | 1.18 |
| RBO + 1.0% DEA | 2.2 | 10.0 | 1.14 |
| RBO + 3.0% DEA | 0.8 | 7.6 | 1.01 |

RBO-crude rice bran oil; DEA-Diethanolamine

We claim:

1. A process for the preparation of rice bran oil low in phosphorous content (<10 ppm) by treatment of crude rice bran oil to substantially remove the phosphoglycolipids responsible for the residual phosphorus in degummed rice bran oil, said process comprising:

a) treating the crude rice bran oil at ambient temperature with 5% of boiling water and separating the sludge formed to obtain a clarified oil, b) treating the clarified oil thus obtained with 0.5% to 10% of a reagent selected from the group consisting of mono-, di- or triethanolamine to obtain said low phosphorous content oil.

2. A process as claimed in claim 1 wherein in step (b) after sufficient contact period a further quantity of boiling water (5%) is added and the sludge so formed removed to obtain oil with less than 10 ppm of phosphorus.

3. A process as claimed in claim 1 wherein the clarified oil obtained in step (a) is treated in step (b) with a 10% excess of the said reagent over the stoichiometric requirement to neutralize the free fatty acids present and then treated with a further quantity of boiling water in an amount of 5% of the mixture to obtain an oil with less than 0.5% free fatty acids, subjecting said oil to bleaching and deodorization to obtain oil with less than 10 ppm of phosphorus with the micronutrients present in the oil substantially intact.

4. A process as claimed in claim 1 wherein in step (a) the separation of the sludge formed is done by centrifugation, filtration or any other suitable method.

* * * * *